(12) United States Patent
Sammons et al.

(10) Patent No.: US 11,715,310 B1
(45) Date of Patent: Aug. 1, 2023

(54) USING NEURAL NETWORK MODELS TO CLASSIFY IMAGE OBJECTS

(71) Applicant: States Title, LLC, San Francisco, CA (US)

(72) Inventors: Daniel Sammons, Alameda, CA (US); Andy Mahdavi, San Francisco, CA (US)

(73) Assignee: States Title, LLC, San Francisco, CA (US)

( * ) Notice: Subject to any disclaimer, the term of this patent is extended or adjusted under 35 U.S.C. 154(b) by 211 days.

(21) Appl. No.: 17/062,414

(22) Filed: Oct. 2, 2020

(51) Int. Cl.
| | |
|---|---|
| *G06V 10/22* | (2022.01) |
| *G06N 3/08* | (2023.01) |
| *G06V 30/412* | (2022.01) |
| *G06V 30/413* | (2022.01) |
| *G06F 18/214* | (2023.01) |
| *G06F 18/21* | (2023.01) |
| *G06V 30/10* | (2022.01) |

(52) U.S. Cl.
CPC .............. *G06V 10/22* (2022.01); *G06F 18/214* (2023.01); *G06F 18/2163* (2023.01); *G06N 3/08* (2013.01); *G06V 30/412* (2022.01); *G06V 30/413* (2022.01); *G06V 30/10* (2022.01)

(58) Field of Classification Search
CPC ....... G06V 10/22; G06V 10/774; G06V 30/10; G06V 30/412; G06V 30/413; G06N 3/08; G06N 20/00; G06K 9/6256; G06K 9/6261
See application file for complete search history.

(56) References Cited

U.S. PATENT DOCUMENTS

| | | | | |
|---|---|---|---|---|
| 5,361,201 | A * | 11/1994 | Jost et al. ............... | G06Q 40/02 705/35 |
| 10,402,640 | B1* | 9/2019 | Becker et al. ........... | G06N 3/04 |
| 11,367,297 | B2* | 6/2022 | Bildner et al. ....... | G06K 9/6256 |
| 2019/0019020 | A1* | 1/2019 | Flament et al. ........ | G06V 30/40 |
| 2019/0180115 | A1* | 6/2019 | Zou ..................... | B60W 30/12 |
| 2020/0160050 | A1* | 5/2020 | Bhotika et al. ...... | G06V 30/414 |
| 2020/0372623 | A1* | 11/2020 | Lawlor et al. ..... | G01C 21/3804 |
| 2020/0394567 | A1* | 12/2020 | Choe et al. .......... | G06F 40/186 |

* cited by examiner

*Primary Examiner* — Daniel G Mariam
(74) *Attorney, Agent, or Firm* — Fish & Richardson P.C.

(57) ABSTRACT

Methods, systems, and apparatus, including computer programs encoded on computer storage media, for machine learning. One of the methods includes receiving an image; providing the image to a neural network model, wherein the neural network model is trained to output predictions of one or more locations within the image and corresponding classifications; extracting text content within one or more of the one or more locations; analyzing the extracted text content using the corresponding classifications to evaluate one or more of external consistency with other data records or internal consistency with content from one or more of the particular locations; and generating one or more outputs based on the analyzing.

21 Claims, 5 Drawing Sheets

FIG. 5

USING NEURAL NETWORK MODELS TO CLASSIFY IMAGE OBJECTS

BACKGROUND

This specification relates to machine learning. Conventional machine learning models can be trained to generate a particular type of output from a given input. Typically, a machine learning model is trained using a collection of labeled training data. The machine learning model can be trained such that the model correctly labels the input training data. New data can then be input into the machine learning model to determine a corresponding label for the new data.

SUMMARY

Machine learning models can be used to identify data having a particular type. This specification describes a system that uses a neural network model to process input images and to predict locations and types of data found within the input images. In some implementations, the predicted locations are coordinates defining bounding boxes at particular locations in the image. Each bounding box can be labeled by the neural network according to a set of available classifications. The output can be used to perform further processing on the images, for example, to extract text content from within the bounding boxes. This text can be analyzed to perform further operations, for example, a comparison of the text with other system data to identify discrepancies.

In general, one innovative aspect of the subject matter described in this specification can be embodied in methods that include the actions of receiving an image; providing the image to a neural network model, wherein the neural network model is trained to output predictions of one or more locations within the image and corresponding classifications; extracting text content within one or more of the one or more locations; analyzing the extracted text content using the corresponding classifications to evaluate one or more of external consistency with other data records or internal consistency with content from one or more of the particular locations; and generating one or more outputs based on the analyzing.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Using machine learning models, such as neural network models, eliminates the need for manual interpretation and input of data, which reduces the time needed to evaluate incoming data. Errors in transcription and in understating the data can be greatly reduced. In particular, using a neural network to perform computer vision can more accurately and quickly be used to process input images to identify the content of interest, which can then be processed without concern for other content of the image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example image showing identified regions of a document.

Like reference numbers and designations in the various drawings indicate like elements.

DETAILED DESCRIPTION

Overview

Figure 1:
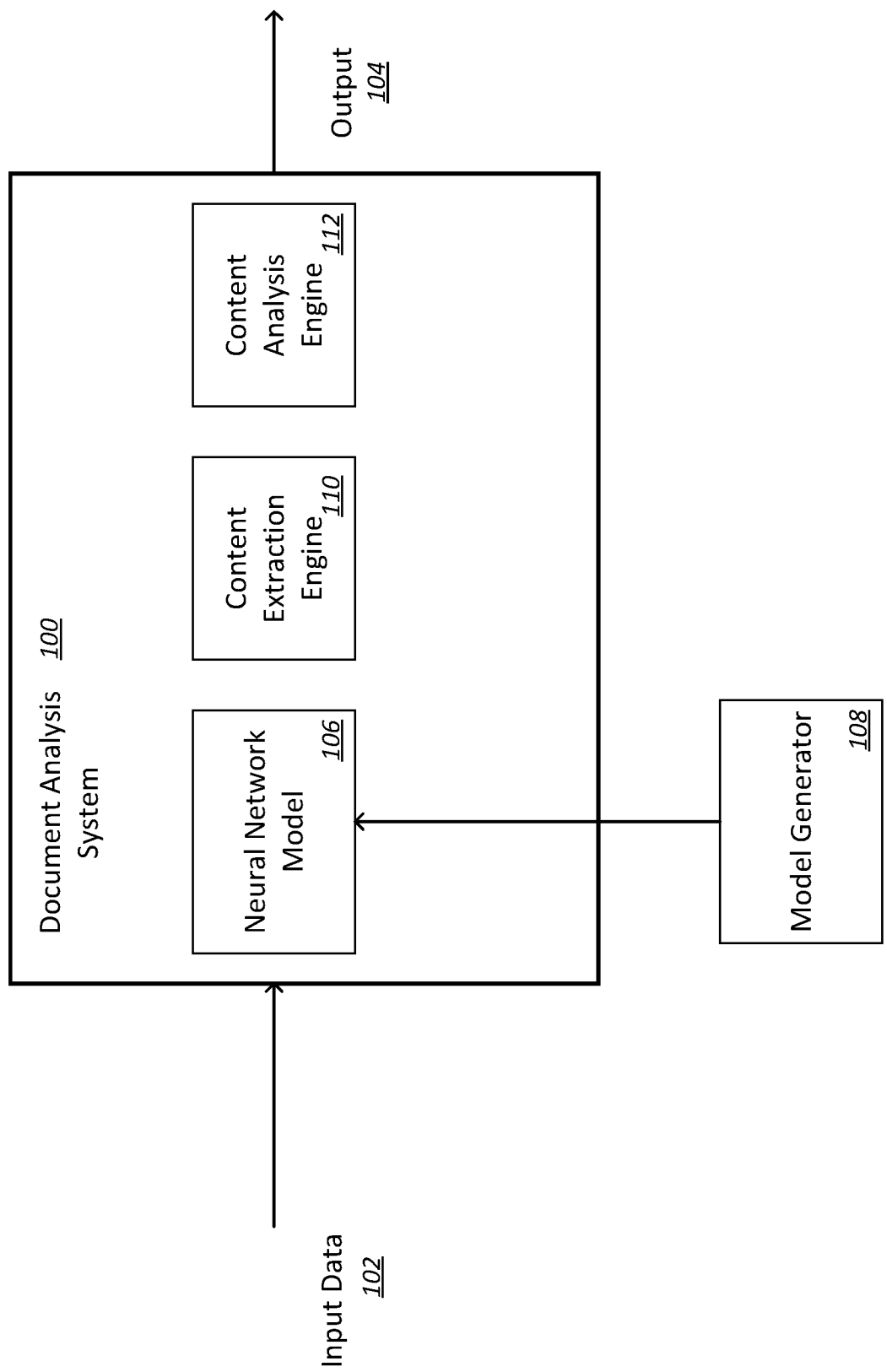
FIG. 1 is an example image analysis system.

Computer vision relates to how computers can be used to understand the content of digital images. For example, computer vision techniques seek to teach computers how to recognize particular objects in images. This specification describes a system that uses a machine learning model, and in particular a neural network model, to process input images and generate output data predicting the locations of the image in which data of a specified type is likely to be located. In some implementations, the machine learning model is a convolutional neural network that performs a number of convolution operations on portions of an input image and uses the output of the convolutions to generate object predictions.

The predictions can then be used to further process the image content. For example, the image can contain textual data. The predicted locations can define bounding boxes surrounding particular text content. The regions defined by the bounding boxes can be further processed to extract and analyze the textual content contained within each bounding box. For example, optical character recognition techniques can be used to convert the image data within the bounding box to readable text. Based on the assigned classification and/or the application of one or more natural language processing techniques, the text can be parsed to identify particular content. This content can further be used, for example, to compare the image content to other records, e.g., to perform validation or to identify inconsistencies.

In some implementations, the described machine learning models are part of a title production system for real property transactions. A title production system is used by title companies to manage workflows and work with various third parties involved in the transaction. During a typical real property transaction, there are a number of actions that need to take place, for example, to generate a title insurance policy for the real property transaction. To facilitate these actions there are a number of forms that need to be understood and checked for inconsistencies.

For example, one form is the universal loan application form, also commonly called a 1003 form. This is a fairly structured form with a number of different fields. For purposes of title evaluation there are particular fields of interest related to vesting, for example, the names of the parties, their relationship, and how title will be held. Even though this is referred to as a "universal" form there are often variations in the layout and shading of the form. Thus, a form generated by one company can have a different background than the same 1003 form for another company. Similarly, checkboxes can change location/labels between different forms. Thus, forms that may look identical at a glance may in fact have a number of variations. Additionally, some forms are received with encoded text content while others are pure images.

Conventionally, a human viewer opens the image file of the 1003 document and manually extracts the corresponding content e.g., by retyping names and other field content into the title production system and visually determining which labels the checked boxes correspond to. This can lead to errors in transcription as well as the potential for errors based on expected checkboxes that have changed position.

Additionally, because the forms have fields that are boxed regions on the form, the corresponding input can appear at various locations within each box. For example, the name of the party can be next to the box label "name" or could be below it. Conventional text processing systems attempting to extract the text would often fail because text processing typically extracts text in rows. However, the content for a particular box may be located zero to several "rows" of the document from the corresponding field label. Thus, even if the image is processed to identify the text, it is difficult to create a rule set to reliably associate the content of the box with the label purely on text strings because there is so much variability in the locations of the input data within each field.

This specification describes a computer vision approach to identify the relevant fields of the form and extract the corresponding content.

FIG. 1 is an example system 100. The system 100 can be (or be a subsystem of) a title production system. In particular, in some instances, the system 100 is an image analysis system that analyzes input data 102 to generate one or more outputs 104.

The image analysis system 100 includes a neural network module 106. The neural network module 106 can generate one or more predictions for an input. In some implementations, the input is an image representing a particular type of document. The neural network module 106 can be generated by a model generator 108. The model generator 108 uses training data to train a model designed to generate a particular prediction based on input data. The module generator 108 can be part of, or separate from, the image analysis system 100.

The content extraction engine 110 is configured to extract particular content based on the output predictions of the neural network module 106. For example, the neural network model 106 can generate predictions of the locations of particular content within an image of a document. The content extraction engine 110 can extract content from those identified portions, for example, by using text recognition and natural language processing techniques to parse the recognized text.

The content analysis engine 112 is configured to analyze the extracted content of the content extraction engine 110 to generate one or more outputs of the image analysis system 100. For example, the content analysis engine 112 can determine whether the extracted content matches other data of the system to verify the document content is correct. The content analysis engine 112 can also determine whether the content within the particular fields of the document is internally consistent. The output 104 can include a confirmation that the document content is accurate or a flag for follow up, e.g., by human agents.

Training a Neural Network

Figure 2:
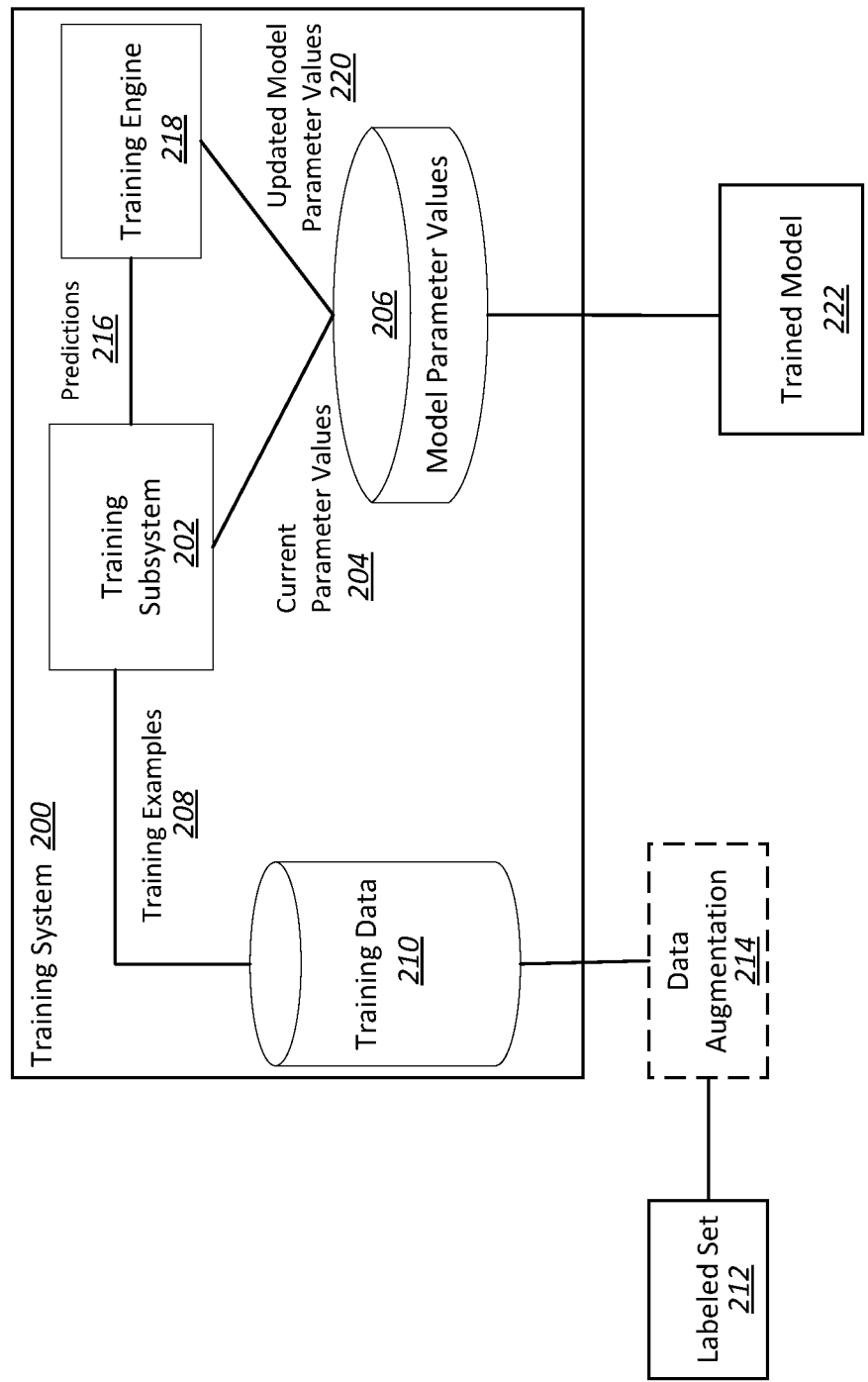
FIG. 2 is an example training system for a neural network.

FIG. 2 is an example training system 200 for a neural network. The training system 200 includes a training neural network subsystem 202 that can implement the operations of each layer of a neural network that is designed to make predictions, for example, of the locations within an image of particular fields of a document, from input data. The training neural network subsystem 202 includes a plurality of computing devices having software or hardware modules that implement the respective operations of each layer of the neural network according to an architecture of the neural network.

The training neural network subsystem 202 can compute the operations of each layer of the neural network using current parameter values 204 stored in a collection of model parameter values 206. Although illustrated as being logically separated, the model parameter values 206 and the software or hardware modules performing the operations may actually be located on the same computing device or on the same memory device.

The training neural network subsystem 202 can receive training examples 208 as input from training data 210. Each training example 208 can be an image labeled with particular bounding box coordinates corresponding to particular labeled fields of a form document represented by the image. For example, the document can be a particular form with various fields. Each field may contain input data. Only particular fields are of interest in the training examples 208.

The training data 210 includes a collection of images. Each image includes a set of labeled fields and coordinate information defining bounding boxes for each of the labeled fields.

The training data 210 can be composed of a human-labeled set 212 alone, or labeled images generated through data augmentation 214.

Human-labeled images each contain drawn bounding boxes and corresponding labels classifying the content of each bounding box. Each bounding box indicates the region of a form document represented by the image in which content corresponding to the label can be found.

Data augmentation allows for a smaller set of human-labeled documents to be used to generate a larger set of documents that introduces variance to the training set. For example, a particular human-labeled document can be augmented to adjust scaling, x or y axis translation, rotation, or change a contrast of text of the document to add variance. For example, an image can be augmented to simulate human induced variances in both form document generation as well as scanning or other techniques used to capture the image. The labeled bounding boxes are transformed according to the augmentation applied, e.g., if a document is scaled the bounding box coordinates of the augmented version of the document are adjusted accordingly. Similarly, if content of an image is translated along the x-axis by a particular amount, a corresponding translation can be applied to the baseline bounding box coordinates.

The training neural network subsystem 202 can generate, for each training example 208, one or more predictions 216 of bounding box locations and corresponding classification labels. A training engine 218 analyzes the object predictions 216 and compares the object predictions to the labels in the training examples 208. The training engine 218 then generates updated model parameter values 220 by using an appropriate updating technique. The training engine 216 can then update the collection of model parameter values 206 using the updated model parameter values 220.

After training is complete, the training system 200 can use a final set of model parameter values to form a trained neural network model 222. The trained neural network model can be used to make predictions based on incoming images.

In some implementations, the training data is based on a set of 1003 forms that have been human labeled or augmented to identify bounding boxes and classifications for each bounding box. For example, each human labeled 1003 form can have hard coded bounding boxed defined for fields of interest in the form such as fields corresponding to "title will be held in what name(s)" or "manner in which title will be held." Each bounding box drawn on the image is further labeled with a particular classification. The classification may be the same as the field text or a shorthand e.g., "names" for "title will be held in what name(s)." The system is trained so that, for a given input 1003 form, predictions of bounding box locations and their classification can be output.

Convolutional Neural Networks

Figure 3:
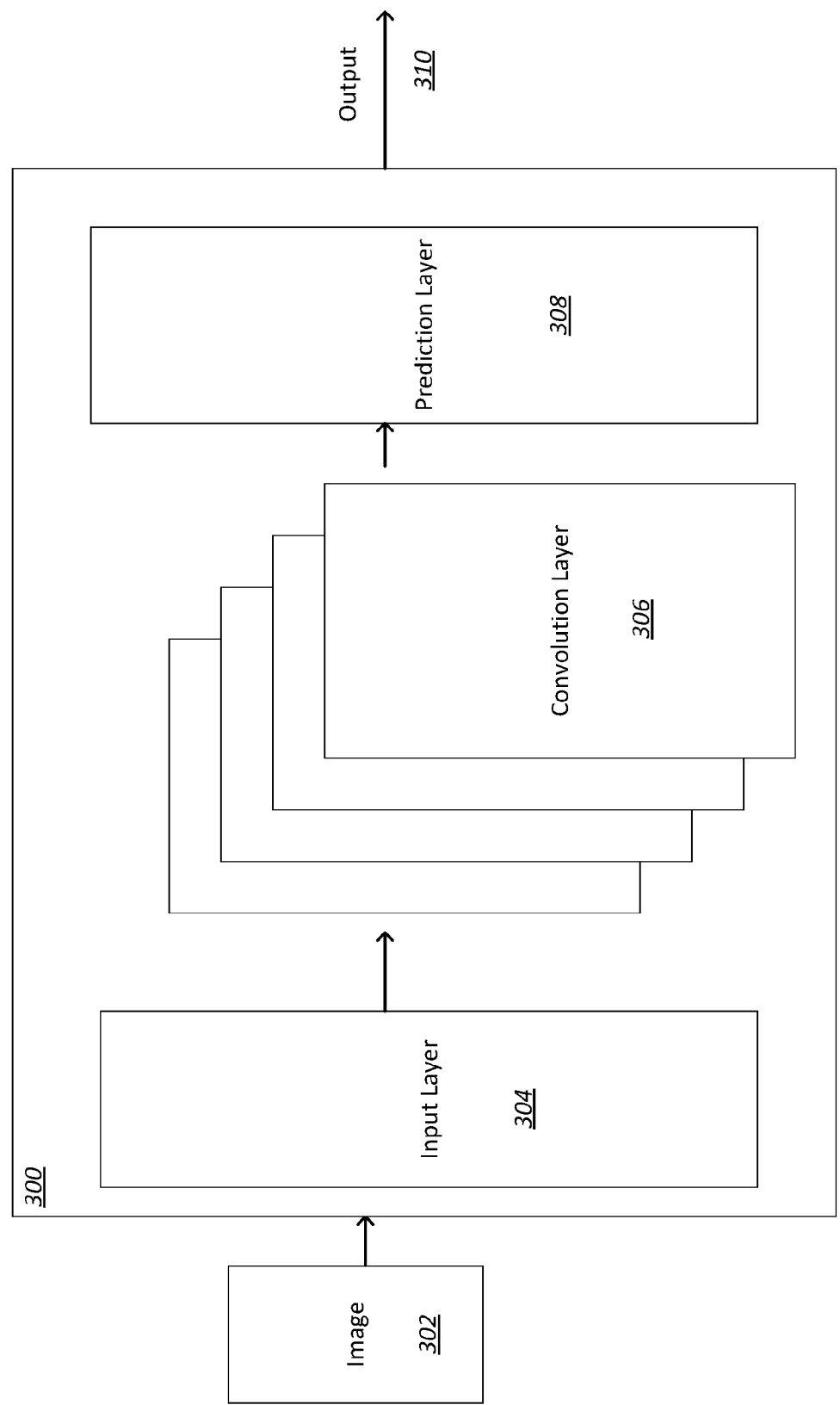
FIG. 3 is an example convolutional neural network.

FIG. 3 is an example convolutional neural network 300. The convolutional neural network 300 can generate one or more predictions for each input image 302. For example, the convolutional neural network 300 can generate predictions of the locations of bounding boxes in the image corresponding to particular classification types of a set of classification types. The convolutional neural network 300 can be trained, for example, as described above with respect to FIG. 2.

The convolutional neural network 300 includes an input layer 304, a convolution layer 306, and a prediction layer 308. The input layer 304 separates the image 302 into a number smaller sub-image portions of the image. For example, in some instances the image 302 has a particular rectangular size in pixels. The input layer can capture a number of squares of pixels from the image 302, for example, using a sliding window of set size. In some implementations, each input image is an image of a form document, for example, saved as a portable document format (PDF) document, having a number of different fields. For example, the form can be a 1003 form that collects information about a real property transaction and includes particular fields collecting information about the transaction including the names of the parties associated with the transaction and a vesting.

The sub-images are provided to the convolution layer 306. The convolution layer can include a number of convolutions, each of which extracts image features from the sub-images. Each convolutional layer has parameters whose values define filters for that layer. Each filter is applied to the sub-images to generate a corresponding feature map. Each convolutional layer 306 can therefore generate a different feature map for each sub-image. The parameter values of the filters are determined during the training of the convolutional neural network.

The convolutional neural network 300 also includes a prediction layer 308 that generates one or more predictions for the image 302 from the convolution outputs of the convolution layer 306. In some implementations, the prediction layer 308 is also a convolutional layer. The output prediction is data that designates locations for each of one or more particular regions of the image as likely to define a bounding box that is occupied by data of a particular class.

In some implementations, the input image is a form document associated with a real estate transaction, e.g., a 1003 form. The image is input to the neural convolutional neural network 300. The output prediction can include a prediction of the location of bounding boxes surrounding particular fields of the 1003 form and a predicted classification of the content within each of those bounding boxes.

Using a Neural Network to Identify and Classify Document Regions

Figure 4:
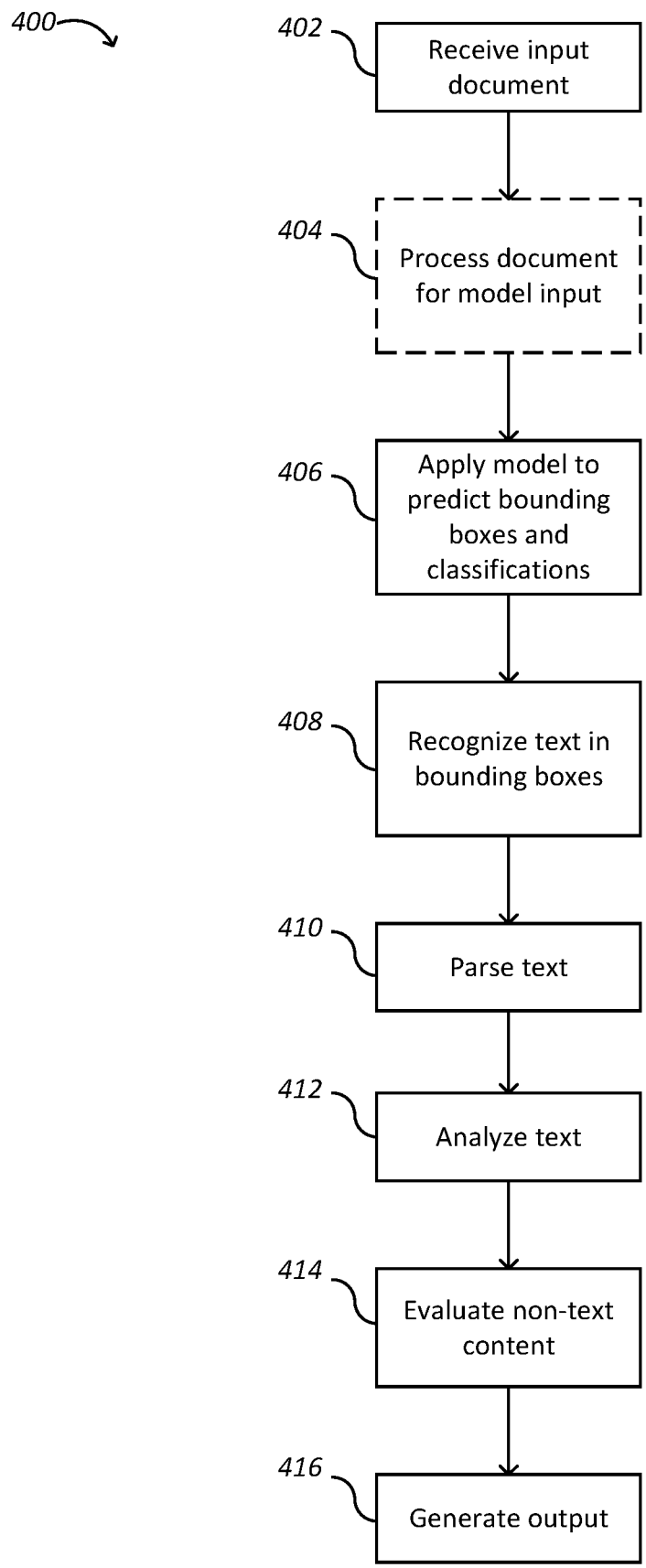
FIG. 4 is a flow diagram of an example method using a convolutional neural network to identify image content.

FIG. 4 is a flow diagram of an example method 400 using a convolutional neural network to identify document content. For convenience, the process 400 will be described as being performed by a system of one or more computers, located in one or more locations, and programmed appropriately in accordance with this specification. For example, the document analysis system 100 of FIG. 1, appropriately programmed, can perform at least part of the process 400.

The system receives an input document (402). The document can correspond to a form having a number of labeled fields, some of which contain content responsive to the labels. In some implementations, the document is a Portable Document Format (PDF) file. The PDF file may be encoded with text information for the form or may only contain an image of the form. In some implementations, the document is a completed 1003 mortgage application document received from a third party such as a lender.

The system optionally processes the document for model input (404). For example, the document can be processed so that the inputs to the model are just images. That is, a text encoded PDF can be processed so that it just contains image information. The text encoding information can be retained for later use. Similarly, if the received document is in another form, such as a word processing file, the document can be converted into an image, e.g., as a PDF.

The system applies the model to the image (406). The model, as described above with respect to FIGS. 2-3, predicts the locations of bounding boxes in the image and their corresponding classifications. In the example of a 1003 mortgage application document, the bounding boxes can correspond to particular fields of the form. The classification can describe the type of field. The classifications may correspond to standard form text for the field or a shorthand label mapped to the type of field content. Whatever the case, the classifications allow for the unique identification of the fields of interest in the form.

Figure 5:
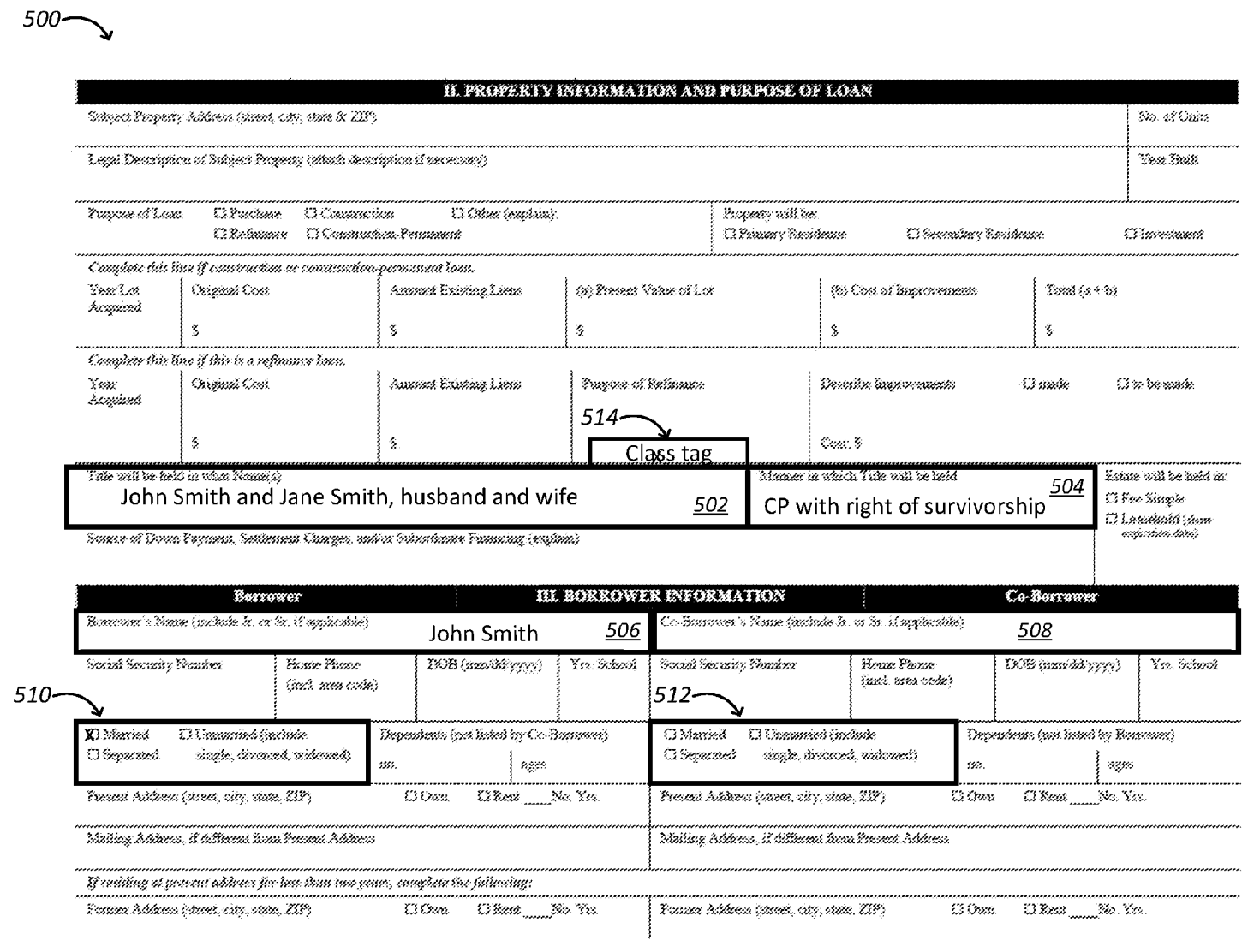

FIG. 5 is an example image 500 showing identified regions of a document. In particular, FIG. 5 shows a portion of an example 1003 form. The form includes a number of different fields. However, only some of these fields are of particular interest. Other fields can be ignored by the processing. Thus, the model does not try to predict bounding boxes for all fields, just the particular fields for which it has been trained. The model predicts the coordinates defining a bounding box around the particular fields of interests. While this internally can be represented as a set of (x, y) coordinates, for illustration each bounding box is shown on the image 500 as bounding boxes 502, 504, 506, 508, 510, and 512. Each bounding box is also associated with a particular classification, illustrated, for example, by tag 514.

Thus, the model output for bounding box 504 may be a set of coordinates defining the vertices of the bounding box 504 and a classification of "manner in which title will be held." This indicates that the model predicts, with a likelihood that exceeds some set threshold, that the content within this region will provide information on the manner in which title will be held for the property of a real estate transaction.

Referring again to FIG. 4, the system extracts content from the identified bounding boxes (408). For example, an optical character recognition technique can be used to recognize all text within the bounding boxes. The recognized text can then be extracted as a text string. In another example, the document originally included encoded text information. The system can pull just the encoded text information corresponding to the locations of the bounding boxes.

The system parses the extracted text content (410). The system needs to parse the extracted text content to separate the labels for the fields that are part of the form from the corresponding content input to the field. Parsing can use both natural language processing techniques as well as the classification information. For example, referring to FIG. 5, the text string extracted from bounding box 504 can be the string "Manner in which Title will be held as community property with right of survivorship". Because the classification is "Manner in which Title will be held" it can be known that this portion is the label of the form field. Naturally, it is not necessary that the classification use the wording of the form, but the classifications can be mapped to standard form label text corresponding to each classification. Consequently, the text can be parsed to retain just "as community property with right of survivorship." Importantly, by extracting text from the bounding box, it is much easier for the system to identify the field text since there are not one or more rows of intervening text form other parts of the form separating the field label from the field content as could occur using other text processing techniques on the document as a whole.

The system analyzes the parsed text content (412). The analysis can include comparisons to check for both internal and external consistency of the parsed text content. Checking for external consistency can include comparing the extracted text to other data sources. For example, the content of the form fields can be compared to file data for the real estate transaction to see, e.g., that the names of the parties are consistent. Checking for internal consistency can include determining whether the parsed text content from the fields are consistent with each other. For example, the type of content in one field may constrain the possible content of another field. In the context of a 1003 form for a real estate transaction, if, for example, the "title will be held in what Name(s)" field includes two names, e.g., John Smith and Jane Smith, an entry of "sole property" in the "manner in which Title will be held" field would be inconsistent with two named title holders since two people cannot hold sole title.

In some implementations, some degree of fuzzy matching can be allowed for determining whether the content matches. For example, the field text may include a middle initial while the file data may include a full middle name. In another example, the manner in which title will be held may be abbreviated on the form, for example, "SP" for sole property. The system can define particular fuzzy matching rules and tolerances that allow for variation depending on the type of variation and a confidence that the variation is still a match.

The system evaluates non-text content (414). The bonding boxes identified by the model may include non-text content. For example, referring to FIG. 5, the bounding boxes 510 and 512 include checkboxes. While it may be possible to recognize an "x" checking a box, the text string will typically not indicate which label the "x" belongs to.

In some implementations, the model can be trained to recognize which box is checked as part of the predicted classification. Thus, for example, bounding box 510 may be classified as "married" because that checkbox is checked. As such, the content doesn't need to be separately extracted.

In some other implementations, the content of the checkbox bounding box can be separately processed by another image classifier that can recognize which box is checked, such as a second convolutional neural network that is trained to take only the checkbox region in as input and determine which, if any, of the boxes are checked. For example, bounding box 510 may be extracted as an image which is fed to a second convolutional neural network that determines that the check box corresponding to married is checked.

The checkbox content may still need to be analyzed for consistency. For example, an "unmarried" checkbox may be inconsistent with a "community property" manner in which title will be held. Furthermore, particular classes may trigger further processing steps such as the "separated" box.

The system provides one or more outputs (416). In some cases, the output is that the content matches and a title production workflow can proceed to a next step. In some other cases, the output is a flag for human interaction to resolve one or more discrepancies, for example, discrepancies in internal and/or external consistency. In yet other cases, the flag for human interaction is based on the type of entry into the form, for example, the checking of a "separate" box that requires additional processing.

The present specification describes unconventional steps to solve problems associated with identifying content from images files that are distinct from the conventional approaches. In particular, errors in fee collaboration can be greatly reduced from both manual evaluation and conventional OCR techniques taken alone. The content of particular document fields can be identified and evaluated with high confidence and accuracy automatically. Using a convolutional neural network to identify particular regions of the image improves the functions of the system by allowing for efficient evaluation of the content of the bounding boxes that is difficult with other techniques.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In addition to the embodiments of the attached claims and the embodiments described above, the following embodiments are also innovative:

Embodiment 1 is a method, the method comprising: receiving an image; providing the image to a neural network model, wherein the neural network model is trained to output predictions of one or more locations within the image and corresponding classifications; extracting text content within one or more of the one or more locations; analyzing the extracted text content using the corresponding classifications to evaluate one or more of external consistency with other data records or internal consistency with content from one or more of the particular locations; and generating one or more outputs based on the analyzing.

Embodiment 2 is the method of embodiment 1, wherein each location within the image is defined by bounding box coordinates defining a particular region of the image.

Embodiment 3 is the method of any one of embodiments 1 through 2, wherein the extracting text content comprises performing character recognition within the boundaries of each bounding box.

Embodiment 4 is the method of any one of embodiments 1 through 3, wherein the neural network model is a convolutional neural network and wherein the convolutional neural network is trained based on a collection of labeled images defining coordinates of regions of interest in the respective documents along with labeled classifications for each region of interest.

Embodiment 5 is the method of any one of embodiments 1 through 4, wherein the collection of labeled images comprise both human-labeled images and augmented images.

Embodiment 6 is the method of any one of embodiments 1 through 5, wherein the generating one or more outputs comprises flagging the image as requiring additional evaluation.

Embodiment 7 is the method of any one of embodiments 1 through 6, wherein each image corresponds to a document, wherein the document is a form having a plurality of fields, each field having a form label and wherein one or more of the fields have been filled out with information responsive to the corresponding form labels.

Embodiment 8 is a computer storage media encoded with instructions that, when executed by one or more computers, cause the one or more computers to perform the method of any one of embodiments 1-7.

Embodiment 9 is a system comprising one or more computers and one or more storage devices storing instructions that are operable, when executed by the one or more computers, to cause the one or more computers to perform the method of any one of embodiments 1-7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving an image;
   providing the image to a neural network model, wherein the neural network model is trained to output predictions of one or more locations within the image, each location defined by a respective bounding box, and corresponding classifications for each location;
   extracting text content within one or more of the bounding boxes output by the neural network model;
   analyzing the extracted text content using the corresponding classifications to evaluate one or more of external consistency with other data records or internal consistency with content from at least one other location of the one or more locations; and
   generating one or more outputs based on results of the analyzing the extracted text content to evaluate one or more of external consistency or internal consistency.

2. The method of claim 1, wherein each location within the image is defined by bounding box coordinates defining a particular region of the image.

3. The method of claim 2, wherein the extracting text content comprises performing character recognition within the boundaries of each bounding box.

4. The method of claim 1, wherein the neural network model is a convolutional neural network and wherein the convolutional neural network is trained based on a collection of labeled images defining coordinates of regions of interest in the respective documents along with labeled classifications for each region of interest.

5. The method of claim 4, wherein the collection of labeled images comprise both human-labeled images and augmented images.

6. The method of claim 1, wherein the generating one or more outputs comprises flagging the image as requiring additional evaluation.

7. The method of claim 1, wherein each image corresponds to a document, wherein the document is a form having a plurality of fields, each field having a form label and wherein one or more of the fields have been filled out with information responsive to the corresponding form labels.

8. One or more non-transitory computer storage media encoded with instructions that, when executed by one or more computers, cause the one or more computers to perform operations comprising:
   receiving an image;

providing the image to a neural network model, wherein the neural network model is trained to output predictions of one or more locations within the image, each location defined by a respective bounding box, and corresponding classifications for each location;

extracting text content within one or more of the bounding boxes output by the neural network model;

analyzing the extracted text content using the corresponding classifications to evaluate one or more of external consistency with other data records or internal consistency with content from at least one other location of the one or more locations; and generating one or more outputs based on results of the analyzing the extracted text content to evaluate one or more of external consistency or internal consistency.

9. The non-transitory computer storage media of claim 8, wherein each location within the image is defined by bounding box coordinates defining a particular region of the image.

10. The non-transitory computer storage media of claim 9, wherein the extracting text content comprises performing character recognition within the boundaries of each bounding box.

11. The non-transitory computer storage media of claim 8, wherein the neural network model is a convolutional neural network and wherein the convolutional neural network is trained based on a collection of labeled images defining coordinates of regions of interest in the respective documents along with labeled classifications for each region of interest.

12. The non-transitory computer storage media of claim 11, wherein the collection of labeled images comprise both human-labeled images and augmented images.

13. The non-transitory computer storage media of claim 8, wherein the generating one or more outputs comprises flagging the image as requiring additional evaluation.

14. The non-transitory computer storage media of claim 8, wherein each image corresponds to a document, wherein the document is a form having a plurality of fields, each field having a form label and wherein one or more of the fields have been filled out with information responsive to the corresponding form labels.

15. A system comprising one or more computers and one or more storage devices storing instructions that are operable, when executed by the one or more computers, to cause the one or more computers to perform operations comprising:

receiving an image;

providing the image to a neural network model, wherein the neural network model is trained to output predictions of one or more locations within the image, each location defined by a respective bounding box, and corresponding classifications for each location;

extracting text content within one or more of the bounding boxes output by the neural network model;

analyzing the extracted text content using the corresponding classifications to evaluate one or more of external consistency with other data records or internal consistency with content from at least one other location of the one or more locations; and generating one or more outputs based on results of the analyzing the extracted text content to evaluate one or more of external consistency or internal consistency.

16. The system of claim 15, wherein each location within the image is defined by bounding box coordinates defining a particular region of the image.

17. The system of claim 16, wherein the extracting text content comprises performing character recognition within the boundaries of each bounding box.

18. The system of claim 15, wherein the neural network model is a convolutional neural network and wherein the convolutional neural network is trained based on a collection of labeled images defining coordinates of regions of interest in the respective documents along with labeled classifications for each region of interest.

19. The system of claim 18, wherein the collection of labeled images comprise both human-labeled images and augmented images.

20. The system of claim 15, wherein the generating one or more outputs comprises flagging the image as requiring additional evaluation.

21. The system of claim 15, wherein each image corresponds to a document, wherein the document is a form having a plurality of fields, each field having a form label and wherein one or more of the fields have been filled out with information responsive to the corresponding form labels.

* * * * *